United States Patent [19]

Ishizaka et al.

[11] 4,200,381
[45] Apr. 29, 1980

[54] PHOTOGRAPHING MODE SWITCHING MECHANISM IN CAMERA

[75] Inventors: Sunao Ishizaka; Yoshitaka Araki, both of Tokyo, Japan

[73] Assignee: Nippon Kogaku K.K., Tokyo, Japan

[21] Appl. No.: 21,225

[22] Filed: Mar. 16, 1979

[30] Foreign Application Priority Data

Mar. 22, 1978 [JP] Japan ............................ 53-35499[U]

[51] Int. Cl.$^2$ .......................................... G03B 17/00
[52] U.S. Cl. ..................................... 354/289; 354/38
[58] Field of Search ................. 354/270, 271, 289, 46, 354/47, 272, 273, 202, 38, 286

[56] References Cited

U.S. PATENT DOCUMENTS

| | | | |
|---|---|---|---|
| 3,264,966 | 8/1966 | Starp | 354/289 |
| 4,045,807 | 8/1977 | Ito et al. | 354/38 |
| 4,118,716 | 10/1978 | Suzuki et al. | 354/38 |
| 4,118,726 | 10/1978 | Kuramoto et al. | 354/289 |

FOREIGN PATENT DOCUMENTS 50-30519  3/1975  Japan .

Primary Examiner—John Gonzales
Attorney, Agent, or Firm—Fitzpatrick, Cella, Harper & Scinto

[57] ABSTRACT

An improved photographing mode switching mechanism is disclosed which is adapted for a camera provided with a switchover member movable between a first position in which non-diaphragm control mode is selected and a second position in which diaphragm control mode is selected. The improved photographing mode switching mechanism comprises a detection member for detecting the position of preset diaphragm ring of the lens tube and a control means for controlling the switchover member and the detection member. When the detection member detects that the diaphragm ring is in a position for the minimum aperture, the control means allows the switchover member to stay in the second position. When the switchover member is in the second position and also the detection member detects a movement of the diaphragm ring from the position for the minimum aperture to another position, the control means is connected with the switchover member and the detection member so as to move the switchover member from the second position to the first position.

6 Claims, 5 Drawing Figures

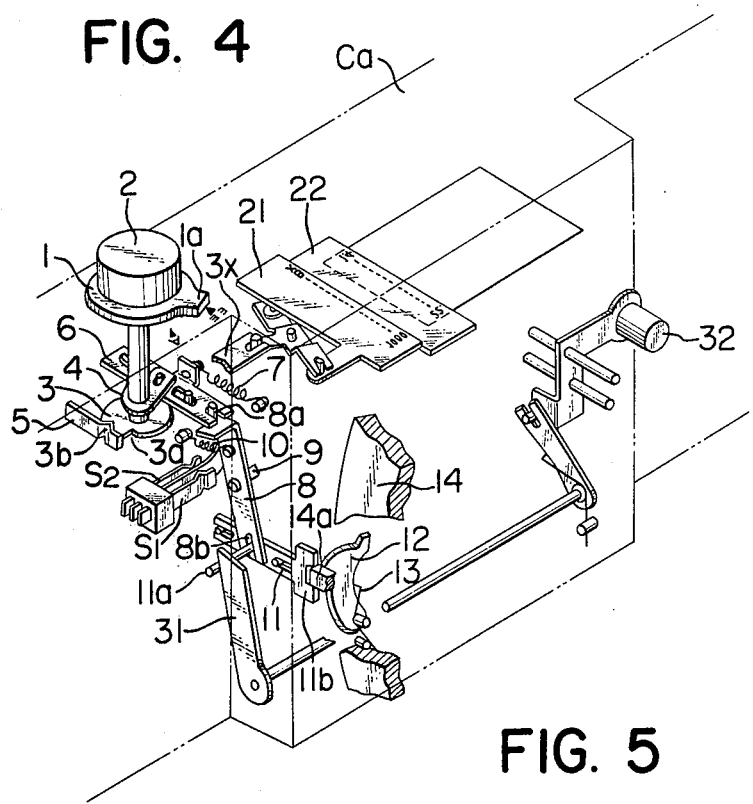
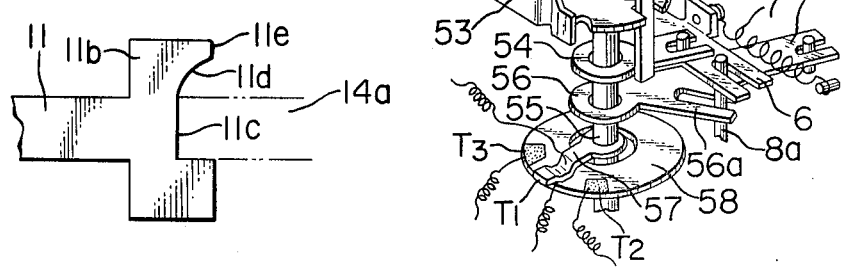

PHOTOGRAPHING MODE SWITCHING MECHANISM IN CAMERA

BACKGROUND OF THE INVENTION

1. Field of the Invention

The present invention relates to a switching mechanism for switching over the photographing mode of a camera from a shutter speed priority photographing mode or programmed photographing mode (hereinafter this group of modes are referred to generally as diaphragm control mode) to a diaphragm priority photographing mode or a manual photographing mode (hereinafter this group of modes are referred to generally as non-diaphragm control mode) and vice versa.

2. Description of the Prior Art

In the known switching mechanism of the type mentioned above, setting of the camera to the non-diaphragm control mode is effected by bringing a photographing mode switching-over member to its non-diaphragm control mode setting position. The switchover member is allowed to move toward another position, its diaphragm control mode setting position, only when the present diaphragm ring is in a position for the minimum aperture. By moving the switchover member to the diaphragm control mode setting position, setting of the camera to the diaphragm control mode is effected. Herein, for the purpose of this specification, the term "a position for the minimum aperture" means such position in which the diaphragm ring sets the smallest opening. As well known in the art, when it is desired to effect photographing in diaphragm control mode, the diaphragm ring must be brought into the position for the minimum aperture without failure. In this respect, the above described known switching mechanism has the advantage that the operator can not forget to set the diaphragm ring to the position for the minimum aperture when he wishes to carry out photographing in the diaphragm control mode. However, the known mechanism involves a disadvantage. That is, since the diaphragm ring is locked by selecting the diaphragm control mode, no change-over from the diaphragm control mode to non-diaphragm control mode is allowed unless the diaphragm ring is again unlocked, which requires that the switchover member be brought into the nondiaphragm control mode position. Therefore, in order to effect photographing in the non-diaphragm control mode, the operator has to operate the switchover member and the diaphragm ring separately. This makes the operation of camera complicated and troublesome for the operator.

SUMMARY OF THE INVENTION

We have conceived and contribute by a mode switching mechanism for a camera by which we are able to eliminate the disadvantages of the known switching mechanism mentioned above.

According to one aspect of the present invention, we provide a photgraphing mode switching mechanism which enables us to switch over the mode from diaphragm control mode to non-diaphragm control mode only by operating the diaphragm ring without any need of operation of the switchover member.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 3 is an enlarged view of the slide lever used in the mechanism;

FIG. 4 is a view similar to FIG. 2 but showing the mechanism in the position wherein the switch dial is set at indication mark EE; and FIG. 5 schematically shows a second embodiment of the invention with the switch dial set at indication mark A.

DESCRIPTION OF THE PREFERRED EMBODIMENTS

Figure 1:
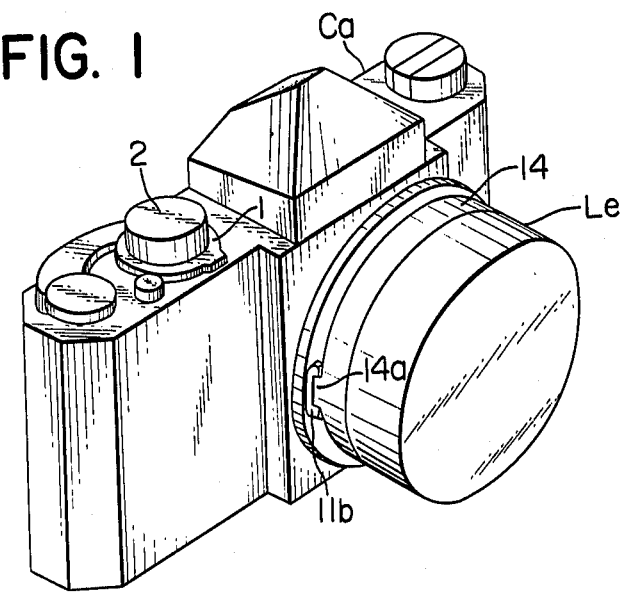
FIG. 1 is a perspective view of a camera in which the present invention is embodied.

Referring first to FIGS. 1 to 4 showing the first embodiment of the present invention, the body of a camera is generally designated by Ca on which a lens tube Le is mounted. The reference numeral 1 designates a mode switching dial which is rotatable around a shutter dial 2. When non-diaphragm control mode is selected, the projection 1a of the mode switching dial 1 is set at the indication mark A whereas when diaphragm control mode is selected it is set at the indication mark EE. In this embodiment, as the non-diaphragm control mode, there is employed such photographing mode in which an optimum exposure is made by manual setting of the selected diaphragm value, and as diaphragm control mode there is employed such photographing mode in which an optimum exposure is made by manual setting of the selected shutter speed.

Figure 2:
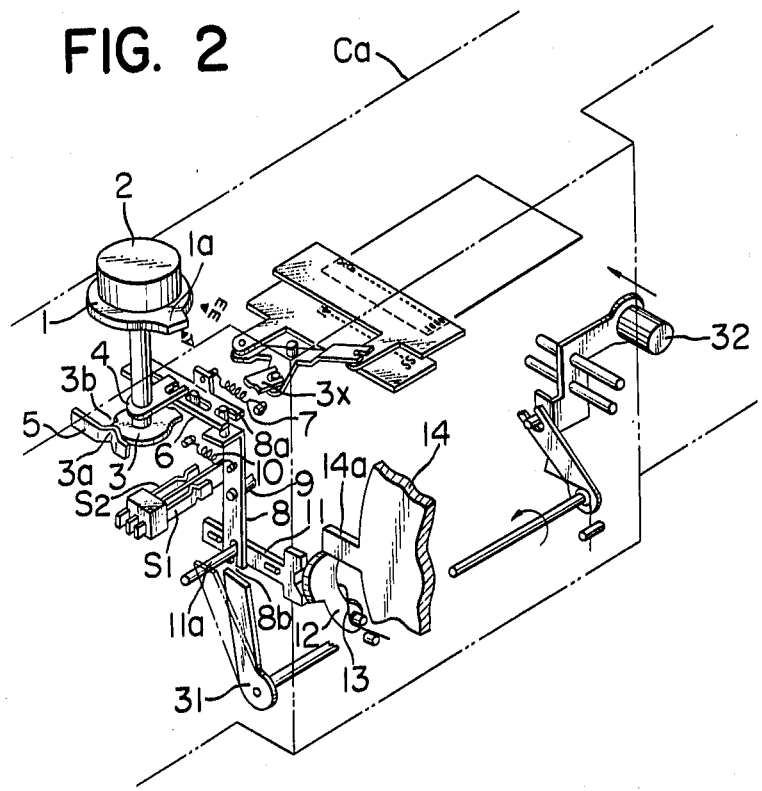
FIG. 2 schematically shows the mechanism of a first embodiment of the invention in the position wherein the switch dial is set at indication mark A.

As best seen in FIGS. 2 and 4, a rotary plate 3 and a rotary lever 4 rotate together with the dial 1. On the circumference of the rotary plate 3 there are provided two notches 3a and 3b. A click spring 5, one end of which is secured to the camera body Ca, is disposed to contact the rotary plate 3. When the projection 1a is in alignment with the mark A, the distal end of the click spring 5 is engaged in the notch 3a. When the projection 1a is set at the mark EE, the distal end of the click spring 5 is engaged in the other notch 3b. A rotation of the lever 4 causes a slide lever 6 to slide in the direction of its length against the force of a spring 7 which biases the slide lever 6 to the right, as viewed in FIG. 2. A swing lever 8 is rotatably mounted on a pivot 9 and is biased counter-clockwise, as viewed, by a spring 10. At the one end of the lever 8 a pin 8a is loose-fitted in a U-shaped slot formed at an end of the slide lever 6. The spring force of the spring 10 is almost equal to that of the above mentioned spring 7. At the other end of the swing lever 8 there is formed a U-shaped slot 8b in which a pin 11a, extending from a slide lever 11 is loose-fitted.

A change-over switch $S_1$ which is normally closed, is opened by a tab 8c extending laterally of spring lever 8 when that lever rotates counterclockwise, and another changeover switch $S_2$ which is normally held open by a tab 8c, is allowed to close by the same rotation of the lever 8. In this embodiment, the switch $S_1$ serves to actuate a diaphragm priority exposure control circuit (not shown) and the other switch $S_2$ serves to actuate a shutter speed priority exposure control circuit.

A slide lever 11 is slidable in its longitudinal direction and one end thereof 11b is exposed on the side of the lens tube Le, as seen best in FIG. 1. Mounted on the camera body is a rotary plate 12 which is biased by a spring 13 to rotate in a counter-clockwise direction as viewed. Thus, the rotary plate 12 normally takes a position in which it prevents the slide lever 11 from sliding to the right. The lens tube Le has a projection 14a which is rotatable together with the diaphragm ring 14 so as to transmit the motion of the ring 14 to the camera body side. The outer circumference of the rotary plate 12 is formed as a cam surface on which the projection 14a moves. When the diaphragm ring 14, and therefore also the projection 14a, are rotated counter-clockwise, the rotary plate 12 is rotated clockwise by the pressure of the projection 14a. When the diaphragm ring 14 is further rotated and reaches the position for the minimum aperture, the rotary plate 12 is moved up to a position completely retracted from the moving course of the slide lever 11. Therefore, in this position, the slide lever 11 is allowed to move to the right, as viewed in the drawing. The projection 14a is provided on the diaphragm ring in such manner that after retracting of the rotary plate 12, the projection can be opposed to the end 11b of the slide lever 11. As seen best in FIG. 3, the lever end 11b has a recess 11c the inner wall surface 11d of which is gently curved from the bottom to the edge 11e.

The manner of operation of the above described apparatus is as follows:

In the position shown in FIG. 2, the mode switching dial 1 has been turned to set its projection 1a at the mark A. In this position, biasing forces of the two springs 7 and 10 working in opposite directions counterbalance each other so that the switching dial can be held in the position through the engagement of the click spring 5 with the notch 3a of the rotary lever 4. Even when there is a slight difference is spring force between the two springs 7 and 10, the switching dial 1 can be held in the position by the frictional force between the click spring and notch. The slide lever 6 is also in the position shown in FIG. 2 and therefore it prevents the swing lever 8 from rotating counter-clockwise. Since the swing lever 8 can not turn over, or reverse the change-over switches $S_1$ and $S_2$, these two switches remain in their normal positions, that is, $S_1$ is closed and $S_2$ is opened. This means that the mode selected at this time is the non-diaphragm control mode and the diaphragm priority exposure control circuit is operating. Therefore, when the operator sets the diaphragm aperture to any desired value by rotating the diaphragm ring 14 in this position, shutter speed is automatically controlled in accordance with the set value of the diaphragm so as to give an optimum exposure. If the diaphragm ring 14 is rotated to the position for the minimum aperture, then the projection 14a of the diaphragm ring will cause the rotary lever 12 to be retracted from the moving course of the slide lever 11. However, even in such case, the slide lever 11 remains held in the position shown in FIG. 2 by the swing lever 8. In this position, the slide lever 11 cannot move to the right so as to engage its end portion 11b with the projection 14a of the diaphragm ring 14. Thus, a smooth rotation of the diaphragm ring can be assured.

When the diaphragm ring 14 is in a position other than the position for the minimum aperture shown in FIG. 2 and the switching dial 1 is rotated to align the projection 1a with the mark EE, the mechanism operates in the following manner:

By rotating the switching dial 1 counter-clockwise starting from the position shown in FIG. 2, the rotary plate 3 is also rotated in the same direction. The click end of the click spring 5 is disengage from the notch 3a and then engaged in the next notch 3b. On the other hand, the rotation of the switching dial 1 causes the rotary lever 4 to rotate counter-clockwise, which in turn drives the slide lever 6 to the left, as viewed, against the force of spring 7. This slide movement of the lever 6 causes the swing lever 8 to be released from locking engagement of and of its ends with the lever 6. Therefore, the spring 10 tends to rotate the swing lever 8 counter-clockwise about its pivot 9; but this rotation of the swing lever is prevented by the slide lever 11, since, as previously noted, the diaphragm ring 14 is not in the position for the minimum aperture but in a position in which the rotary plate 12 remains in the moving course of the slide lever 11 under the action of spring 13. Therefore, the rotary plate 12 prevents a rightward movement of the slide lever 11 which in turn prevents the swing lever 8 from rotating counter-clockwise under the action of spring 10. In this manner, when the projection 1a of the switching dial is set at the mark EE, only the rotary plate 3, rotary lever 4 and slide lever 6 are allowed to move from the respective positions shown in FIG. 2. Neither the swing lever 8 nor the slide lever 11, move from the positions shown in FIG. 2 because of the presence of the rotary plate 12. Since the rotation of the swing lever 8 is prevented in this manner, there is caused no change of the positions of switches $S_1$ and $S_2$ and therefore $S_1$ remains closed and $S_2$ remains open. Releasing the operator's hold of the switching dial 1 thereafter will bring fourth the returning of the slide lever 6, rotary lever 4, rotary plate 3 and switching dial to the positions shown in FIG. 2 by the biasing force of spring 7. Thus, no setting of the projection 1a of the switching dial 1 at the mark EE is possible in this case. Since the frictional force existing between the click spring 5 and the notch 3b is less than the spring force of the spring 7, the above movable members can be returned to the position shown in the drawing under the action of the spring 7.

When the projection 1a of the switching dial is moved to the mark EE after the diaphragm ring 14 has been rotated counter-clockwise to the position for the minimum aperture, the mechanism operates in the following manner:

When the diaphragm ring 14 is rotated counter-clockwise (toward the direction of small diaphragm aperture) from the position shown in FIG. 2, the projection 14a of the diaphragm ring rotates the rotary plate 12 clockwise against the force of spring 13 so that the rotary plate 12 is gradually retracted from the moving course of the slide lever 11. The rotary plate 12 will have been completely retracted outside of the moving course of the slide lever 11 when the diaphragm ring 14 reaches the position for the minimum aperture. At this time, the projection 14a is opposed to the end 11b of the slide lever 11 (see FIG. 4). A rotation of the switching dial 1 with its projection 1a from the mark A to mark EE in this position will cause a leftward movement of the slide lever 6 in the same manner as described above. As a result, the swing lever 8 is rotated counter-clockwise by the force of spring 10 and the slide lever 11 whose pin 11a is in engagement with the swing lever 8 is moved rightward as viewed in the drawing. Since, as above noted, the end 11b of the slide lever 11 is opposed to the projection 14a of the diaphragm 14 after the rotary plate 12 is retracted, the slide lever 11 can be moved rightward until the bottom wall surface of recess 11c formed at the end 11b of the slide lever 11 comes into contact with the projection 14a of the diaphragm ring 14 (see FIG. 4). At the same time, during the counter-clockwise rotation of the swing lever 8, the tab 8c of the lever contact then change-over switches $S_1$ and $S_2$ so as to reverse the positions of the switches. Thus, $S_1$ is opened and $S_2$ is closed as shown in FIG. 4 so that diaphragm control mode, namely the shutter speed priority exposure control circuit is brought into operation. After the operator releases his hold on the switching dial 1, the latter can be held in the described position by the frictional force existing between the click spring 5 and the notch 3b which force is greater than the difference in spring force between the spring 10 and the spring 7. Therefore, in this position, the operator can set the shutter speed to any desired value by rotating the shutter dial 2. In accordance with the shutter speed then set, the diaphragm is automatically controlled to give an optimum value. This position corresponds to that shown in FIG. 4.

Where the switching dial 1 is rotated clock-wise from the position shown in FIG. 4 to align the projection 1a with the mark A, the mechanism operates in the following manner:

With the rotation of the switching dial 1 in the above-mentioned direction, the rotary plate 3 is rotated in the same direction. As a result, the click spring 5 is disengaged from the notch 3b and then engaged in the other notch 3a. Since the rotary lever 4 is rotated clockwise, the slide lever 6 is allowed to move under the action of the spring 7. By this movement of the slide lever 6, the swing lever 8 is rotated clockwise against the force of spring 10 and thereby the slide lever 11 is moved leftward as viewed in the drawing. In this manner, the mechanism is restored to the position shown in FIG. 2. After disengagement of the projection 14a of the diaphragm ring 14 from the end 11b of the slide lever 11, the diaphragm ring is allowed to rotate without any impediment. Of course, the change-over switches $S_1$ and $S_2$ are again turned over by the rotation of the swing lever 8 and thereby the non-diaphragm control mode is set.

When the diaphragm ring 14 is rotated clockwise starting from the position shown in the drawing of FIG. 4, the mechanism operates in the following manner:

In the position shown in FIG. 4, the projection 14a of the diaphragm ring 14 is in engagement with the end recess 11c of the slide lever 11. This engagement is so strong that it is impossible to disengage the projection 14a from the recess 11c with a force as usually used for operating the diaphragm ring. The engagement normally prevents the diaphragm ring 14 being easily removed from the set position. However, as shown in FIG. 3, and as previously described, the recess 11c has a gently curved surface 11d. By rotating the diaphragm ring with a force somewhat larger than that usually used, the projection 14a can be moved along the portion of the gently curved surface 11d. When the projection 14a is moved in this manner along the gently curved surfface portion 11d, the slide lever 11 is moved leftward against the force of spring 10. After a further rotation of the diaphragm ring 14, the projection rides on the end edge portion 11e of the lever 11 and the latter enters the position shown in FIG. 2. As a result, the swing lever 8 is also rotated clockwise and returned to the position shown in FIG. 2. The pin 8a of the swing lever 8 being retracted, the slide lever 6 is allowed to return to the position shown in FIG. 2 under the action of spring 7 and the switching dial 1 is rotated clockwise. In this manner, all the members of the mechanism are returned to the positions shown in FIG. 2 respectively. At the time the swing lever 8 is returned, the change-over switches $S_1$ and $S_2$ are turned over to non-diaphragm control mode. After the diaphragm ring has once left the position for the minimum aperture (the position shown in FIG. 4) is this manner, and moved to any other position (for example, to the position shown in FIG. 2), the diaphragm ring 14 is allowed to rotate independently of the end portion 11b of the slide lever 11.

The end portion 11b of the slide lever 11 no longer prevents free rotation of the diaphragm ring.

As will be understood from the foregoing, the slide lever 11 constitutes a member for detecting the position of the diaphgram ring. Also, the members 3 through 10 constitute means for controlling the detection member and the switching member (which is, in this embodiment, the switching dial 1). These control means allow the switching member to stay in its diaphragm control mode setting position when the detection member detects, through its own replacement, that the diaphragm ring is in the position for the minimum aperture. When the detection member detects that the diaphragm ring has been moved from the position for the minimum aperture to any other position, the control means causes the switching member to move from the diaphragm control mode setting position to the non-diaphragm control mode setting position.

In the above described embodiment, the change-over switches have been shown to be turned over from one position to another my the swing lever 8. However, turnover of the change-over switches may be effected using any other member convenient to the purpose, provided that its position changes in accordance with the position at which the switching member (switching dial) is set. With this arrangement, it is assured that there is always obtained a photographing mode (non-diaphragm control mode or diaphragm control mode) correctly corresponding to the set position of the mode switching member.

With the above embodiment, it is possible to know which mode is set, by reading the position of the switching dial. But, it is impossible to indicate what diaphragm value is to be selected to give an optimum exposure for the shutter speed priority photographing mode or to indicate what shutter speed is to be selected to give an optimum exposure for diaphragm priority photographing mode. This problem may be solved by inserting in the optical path of an indication optical system (not shown) as indication plate on which diaphragm value or shutter speed can be displayed. In this case, the diaphragm value displaying plate belongs to the shutter speed priority mode, whereas the shutter speed displaying plate belongs to the diaphragm priority mode and it depends upon the set position of the switching dial which display plate is to be inserted in the light path of the indication optical system. By way of example, FIG. 2 shows such arrangement for indicating diaphragm value and shutter speed.

In FIG. 2 the reference numeral 21 designates an indication plate which is calibrated in shutter speeds and 22 is an indication plate which is calibrated in diaphragm values. Extending from the rotary plate 3 is a branch 3x the function of which is to move either of the indication plates 21 and 22 into the optical path of the indication optical system in accordance with the position of the switching dial 1. An electric circuit (not shown) lights and indicates the mark on the inserted indication plate, the image of which is introduced into the view finder of the camera. Thus, when the switching dial 1 is set at the mark A, the operator can read the shutter speed on the indication plate 21 through the view finder. Similarly, when the switching dial is at the mark EE, he can read the diaphragm value on the indication plate 22 through the view finder.

In case the lens tube Le is removably mounted on the camera body Ca as in the case of the above embodiment, when the switching dial 1 was set at the mark EE and the projection 14a of the diaphragm ring was in engagement with the exposed lever end 11b, a larger force was required to remove the lens tube Le as compared with the force required at the time the projection 14a was out of engagement with the lever end 11b. This was inconvenient to the operator. To solve the problem there is provided a lens detachment button 32. By pressing the button 32 the slide lever 11 can be retracted forcibly. For this purpose, as shown in FIGS. 2 and 4, the lens detachment button 32 is operatively connected with a rotary lever 31 which is engageable with the pin 11a mounted on the slide lever 11. By pressing the button 32 from the position shown in FIG. 4, the rotary lever 31 is rotated counter-clockwise and therefore the pin 11a is moved leftward so that the slide lever 11 is retracted in the same direction.

The first embodiment described above with reference to FIGS. 1 to 4 is directed to the case wherein switchover is effected between diaphragm priority photographing mode and shutter speed priority photographing mode. Now, referring to FIG. 5, the second embodiment of the invention will be described which is directed to the case wherein selection of the photographing mode can be made from among the group of manual photographing mode, diaphragm priority photographing mode (these two modes belong to non-diaphragm control mode), shutter speed priority photographing mode and program controlled photographing mode (the latter mentioned two modes belong to diaphragm control mode). In FIG. 5, those parts shown in respect of the description of the first embodiment are omitted from the drawing.

In FIG. 5, a mode switching dial 51 is rotatably mounted on the camera body Ca. The dial 51 has a projection 51a which can be set at the mark A, mark EE or manual photographing mark M. The dial 51 has further an elongation 51b suspending from a portion of the circumference of the dial 51. A rotary plate 52 is engaged with the elongation 51b and is rotated together with the switching dial. On the circumference of the rotary plate 52 there are provided notches in which the tip of a click spring 53 can be engaged in the same manner as in the first embodiment to hold the switching dial 51 at the selected mark position. On the rotation axis 55 of the rotary plate 52 there is rotatably mounted a rotary lever 54 which can be rotated counter-clockwise by the elongation 51b of the switching dial 51. The rotary lever 54 has its free end engaged with a slide lever 6 to move it together with the rotary lever 54. The slide lever 6 has a U-shaped slot formed at one end and in which a pin 8a extending from a swing lever 8 (cf. the first embodiment) is loose-fitted. On the rotation axis 55 there is also rotatably mounted a rotary lever 56 having two branched portions 56a and 56b. The first branch 56a has a U-shaped slot in which the above mentioned pin 8b is loose-fitted. The second branch 56b functionally corresponds to the portion 3x in the first embodiment and serves to operate the indication plates 21 and 22. A switch lever 57 is so mounted on the axis 55 as to rotate together with the mode switching dial 51 sliding on a switch board 58. Terminals $T_1$, $T_2$ and $T_3$ provided on the switch board are connected to diaphragm priority exposure control circuit, shutter speed preference exposure control circuit and manual photographing shutter speed control circuit (all the circuits are not shown), respectively. Each circuit is closed by the switch lever 57 for operation. These terminals $T_1$, $T_2$ and $T_3$ are provided to substitute for change-over switches $S_1$ and $S_2$ in the first embodiment.

Designated by 59 is a shutter dial which is rotatable coaxially with the shuter dial 59 and has a elongation 59a suspended from a part of the circumference of the dial. The elongation 59a is engageable with an inner projection 51c of the switching 51. By rotating the shutter dial 59 clockwise starting from the position shown in FIG. 5, information of shutter speed set at that time is transmitted to the above-mentioned shutter speed priority exposure control circuit and the above-mentioned manual photographing shutter speed control circuit. On the contrary, a counter-clockwise rotation of the shutter dial 59 brings the program photographing control circuit (not shown) into operation. The other parts of the structure of the second embodiment correspond to those of the first embodiment and need not be further described.

The manner of the above described second embodiment is as follows:

Firstly, description will be made as to the case in which the projection 51a of the switching dial 51 is set at the mark A. The position of the mechanism in this case is that shown in FIG. 5 and essentially corresponds to that shown in FIG. 2 of the first embodiment. The biasing forces of the two springs 7 and 10 counter-balance each other in this position and therefore the switching dial 51 is held in the position shown by the frictional force of the click spring 53. In this position, the slide lever 11 is out of contact with the rotary plate 12 and holds the position shown in FIG. 2. Therefore, the diaphragm ring 4 is allowed to rotate independently of the slide lever 11. The switch lever 57, the position of which corresponds to the position of the switching dial 51, is now positioned on the terminal $T_1$ so as to close the diaphragm priority exposure control circuit and to select the diaphragm priority photographing mode. In this position, therefore, the operator can set the diaphragm aperture to any desired value by rotating the diaphragm ring 14. In accordance of the set diaphragm value, shutter speed is automatically controlled to give an optimum exposure value.

If the operator moves the switching dial 51 toward the mark EE starting from the above described position, then the dial 51 will be returned back to the original position, that is, the position of the mark A, by the force of spring 7 so long as the diaphragm ring 14 is in a position other than the position for the minimum aperture. This is because the slide lever 11 cannot move further from the position as previously described regarding the first embodiment. Therefore, in the above described position, setting of the switching dial 51 at the mark EE is impossible and it never occurs in this position that the shutter priority exposure control circuit may be selected by the switch lever 57.

Secondly, description will be made of the case in which the diaphragm ring 14 is in the position for the minimum aperture and the switching dial 51 is further rotated counter-clockwise from the position shown in FIG. 5 to the position in which the projection 51a is set at the mark EE. In this case, the position which the mechanism takes will become the same as that shown in FIG. 4 of the first embodiment.

By moving the switching dial 51 to the mark EE, the rotary lever 54 is rotated counter-clockwise and the slide lever 6 is moved to the left, as viewed in the drawing. Since the slide lever end 11b and the projection 14a are opposed to each other, the leftward movement of the slide lever 6 causes the swing lever 8 to rotate counter-clockwise under the action of the spring 10. As a result, the slide lever 11 is moved to the right. Thus, the switching dial 51 is held in the position set at the mark EE.

Since, as previously noted, the position of the switch lever 57 corresponds to the position of the switching dial 51, the switch lever 57 is now positioned on the terminal T₂ to close the shutter priority exposure control circuit and therefore to select the shutter priority photographing mode. In this position, the operator can set the shutter speed at any desired value by rotating the shutter dial 59 counter-clockwise. In accordance with the shutter speed then set, the diaphragm is automatically controlled to give an optimum exposure value. With the movement of the pin 8a, the rotary lever 56 is rotated counter-clockwise so that the indication plate 22 is moved into the indication optical system in place of the plate 21 previously used. A restoration to the diaphragm priority photographing mode thereafter may be effected in the same manner as in the first embodiment by rotating the switching dial 51 clockwise or by rotating the diaphragm ring 14 clockwise from the position for the minimum aperture to another position.

Thirdly, description will be made as for the case in which the mechanism is set to the program photographing mode which is a diaphragm control mode.

Starting from the position in which the switching dial 51 is set at the mark EE, the shutter dial 59 is rotated counter-clockwise so as to align the letter mark P with the mark 60 while the switching dial 51 remains stationary at the mark EE. Of course, it is possible to start from the position shown in FIG. 5 and to rotate the shutter dial 59 counter-clockwise until the letter P reaches the mark 60. In this case, the elongation 59a of the shutter dial 59 comes into engagement with the inner projection 51c of the switching dial 51 and through this engagement the switching dial 51 is rotated together with the shutter dial 59.

In either case, the rotational movement of the shutter dial 59 results in opening the shutter speed priority exposure control circuit and in closing the program photographing exposure control circuit through a mechanism not shown, although the switch lever 57 remains in the position on the terminal T₂. Thus, in this position, in accordance with the measured brightness of the object, shutter speed and diaphragm value are program-controlled to give an optimum exposure.

Positions of the slide lever 6, slide lever 11, swing lever 8, etc. in this case correspond to those in the case of shutter speed priority photographing mode (diaphragm control mode). The indication plate 22 is in the indication optical system and indicates, in the view finder, a diaphragm value then set by the program photographing exposure control circuit through an electric circuit, not shown. By rotating only the shutter dial 59 clockwise from this position, the apparatus can be restored to the shutter speed priority photographing mode.

Also, by rotating the switching dial 51 from the position of program photographing mode to the mark A, the shutter dial 59 is returned to the position shown in FIG. 5 through the engagement of the elongation 59a with the inner projection 51c. At the same time, other parts of the mechanism are also returned to the position shown in FIG. 5 so that the diaphragm priority photographing mode is set. Of course, the switching dial 51 and the shutter dial 59 will be returned to the position shown in FIG. 5 also by rotating the diaphragm ring 14 clockwise from the position for the minimum aperture to another position in the state of the mechanism set for the program photographing mode. This movement of the diaphgram ring causes the slide lever 11 to move to the left (cf. FIG. 3) and therefore the swing lever 8 is rotated clockwise. As a result, the switching dial 51 and the shutter dial 59 are returned to the position shown in FIG. 5 under the action of the spring 7.

Lastly, description will be made of the case in which photographing is carried out in the manual photographing mode which is a non-diaphragm control mode.

By rotating the switching dial 51 clockwise from the position shown in FIG. 5, the rotary plate 52 and switch lever 57 are also rotated clockwise at the same time. Other members remain in the positions shown in FIGS. 2 and 5 for diaphragm priority photographing mode (non-diaphragm control mode). Since the switch lever 57 is moved to the terminal T₃, the manual photographing shutter speed control circuit is closed and becomes operative. In this position, the operator can select any desired shutter speed by rotating the shutter dial 59 clockwise until the dial mark of the desired shutter speed reaches the indication mark 60. Information of the shutter speed thus selected by the operator is transmitted to the above-mentioned shutter speed control circuit so as to effect setting of the shutter speed. The shutter speed set in this manner is visible in the view finder by way of the indication plate 21 inserted in the optical path of the indication optical system. Setting of the diaphragm aperture is also manually carried out in the conventional manner by rotating the diaphragm ring 14. A counter-clockwise rotation of the switching dial 51 from this position to the mark A will restore the apparatus to the diaphragm priority photographing mode.

In the above described second embodiment, the switching dial 51 and shutter dial 59 functionally correspond to the switching member, that is, the switching dial 1 in the first embodiment. Elements 52 and 54 and 6 to 8a correspond to the control means in the first embodiment. Also, diaphragm priority photographing mode and manual photographing mode in the second embodiment correspond to the non-diaphragm control mode in the first embodiment. Shutter speed priority photographing mode and program photographing mode in the second embodiment correspond to the diaphragm control mode in the first embodiment.

As will be clearly understood from the foregoing, according to the present invention, switchover of the photographing mode from diaphragm control mode to non-diaphragm control mode can be effected by moving the diaphragm ring, which is operated at the time of photographing in non-diaphragm control mode, from the position for the minimum aperture to any other position. Therefore, the switchover of the mode to non-diaphragm control mode can be carried out in a very simple manner and by a simple operation. Of course, with the apparatus according to the invention, switchover of the mode to non-diaphgram control mode can be effected also by operating the mode switching member. Moreover, setting of diaphragm control mode is never effected unless the diaphragm ring is in the position for the minimum aperture. Therefore, the photographer need not be concerned about overlooking the setting of the diaphgram ring.

We believe that the structure and operation of our novel photographing mode switching mechanism will now be understood and that the advantage thereof will be fully appreciated by those persons skilled in the art.

We claim:

1. A photographing mode switching mechanism adapted for a camera and including a switchover member movable between a first position in whch a non-diaphragm control mode is selected and a second position in which a diaphragm control mode is selected, comprising: (a) detection means for detecting the setting position of a preset diaphragm ring on a lens tube of the camera and (b) control means connected to said switchover member and said detection means for allowing said switchover member to remain in its second position when said detection means detects that said diaphragm ring is in the position for the minimum aperture and for moving said switchover member from the second position to the first position when said detection means detects that said diaphgram ring has been moved from the position for the minimum aperture.

2. A photographing mode switching mechanism as claimed in claim 1, wherein said detection means moves from a non-engageable position in which it is out of engagement with said diaphgram ring to an engagement position in which it comes into engagement with said diaphragm ring to detect the presence of said diaphragm ring in the position for the minimum aperture only when said diaphragm ring is in the position for the minimum aperture and said switchover member is in its second position.

3. A photographing mode switching mechanism as claimed in claim 2, wherein said switching mechanism further comprises means for moving said detection means from said engageable position to said non-engageable position to disengage said detection means from said diaphragm ring upon movement of the latter from the position for the minimum aperture when said switchover member is in its second position and said diaphragm ring is in the position for the minimum aperture.

4. A photographing mode switching mechanism as claimed in claim 2, wherein said switching mechanism further comprises a stopping member interlocked with said diaphragm ring to prevent said detection means from moving from said non-engageable position when said diaphragm ring is not in position for the minimum aperture.

5. A photographing mode switching mechanism as claimed in claim 1, and adapted for a camera including a detaching member for use in detaching the lens tube from the camera body, said switching mechanism comprising means for moving said detection means from a position in which it is out of engagement with said diaphragm ring to a position in engagement with said diaphragm ring to detect that said diaphragm is in position for minimum aperture only when said diaphragm ring is in position for minimum aperture and said switchover member is in its second position.

6. A photographing mode switching mechanism as claimed in any of claims 2, 3 or 4 and adapted for a camera including a detaching member for use in detaching the lens tube from the camera body, said switching mechanism further comprising means for moving said detection means from said engageable position to said non-engageable position upon movement of said detaching member.

* * * * *

UNITED STATES PATENT AND TRADEMARK OFFICE
CERTIFICATE OF CORRECTION

PATENT NO. : 4,200,381
DATED      : April 29, 1980
INVENTOR(S) : SUNAO ISHIZAKA, et al.

It is certified that error appears in the above–identified patent and that said Letters Patent are hereby corrected as shown below:

Column 1, line 54, change "controbute" to --contribute--;

line 60, change "photgraphing" to --photographing--.

Column 4, line 17, change "disengage" to --disengaged--.

Column 5, line 34, insert --exposure-- after "optimum".

Column 6, line 48, change "my" to --by--;

line 67, change "as" to --an--.

Signed and Sealed this

Ninth Day of September 1980

[SEAL]

Attest:

SIDNEY A. DIAMOND

Attesting Officer

Commissioner of Patents and Trademark.